June 21, 1966  M. LEHMACHER ETAL  3,257,256
DEVICE FOR WELDING AND CUTTING THERMOPLASTIC WEBS
Filed Feb. 4, 1963
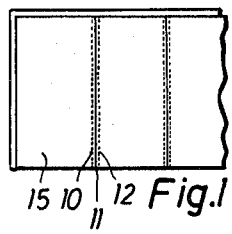
Fig.1
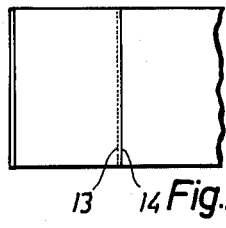
Fig.2
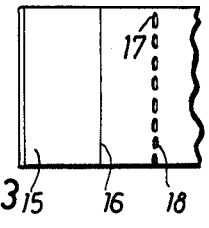
Fig.3
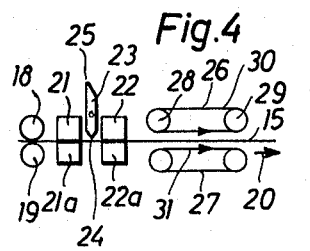
Fig.4
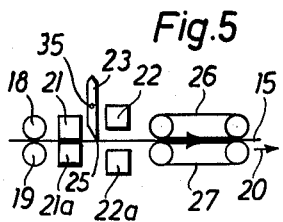
Fig.5
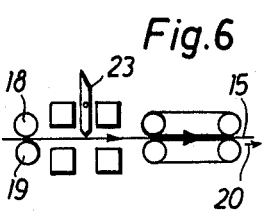
Fig.6
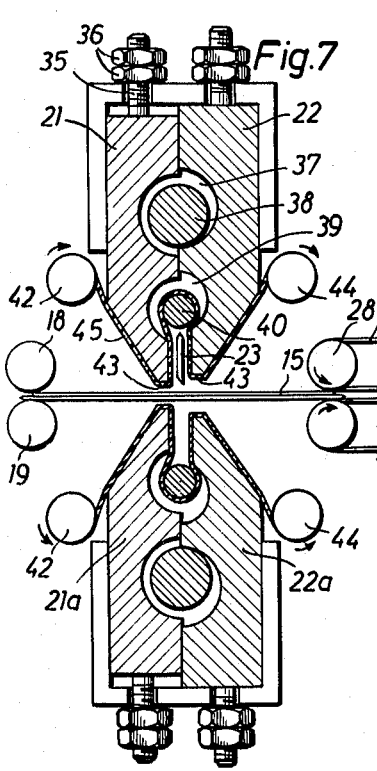
Fig.7
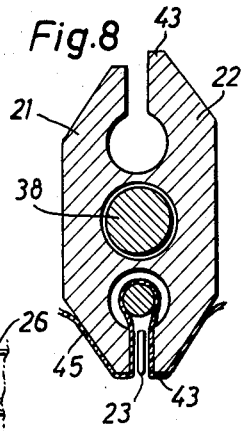
Fig.8
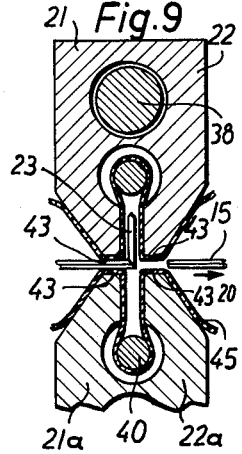
Fig.9
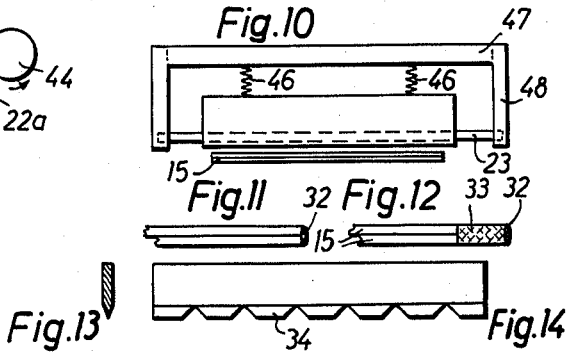

United States Patent Office 3,257,256
Patented June 21, 1966

3,257,256
DEVICE FOR WELDING AND CUTTING
THERMOPLASTIC WEBS
Michael Lehmacher and Johan Mathias Lehmacher, Mondorf uber Troisdorf, Germany, assignors to Lehmacher & Sohn, Mondorf uber Troisdorf, Germany
Filed Feb. 4, 1963, Ser. No. 256,058
Claims priority, application Germany, Feb. 12, 1962, L 41,193
12 Claims. (Cl. 156—495)

The invention relates to a device for welding and/or cutting foils of thermoplastic synthetic substances for the production of bags, sacks or the like, which with only a single device allows sacks, bags or the like to be produced either with a bottom seam or also with a side seam, or a tube or a single foil to be cut or even provided with perforations. Further the same device can be used for producing narrow or wide welded seams. It is therefore a device which is suitable practically for universal use and a device according to the invention can effect the work for which several machines were hitherto necessary. To attain this object it is proposed to provide a device for welding and/or cutting foils of thermoplastic synthetic substances for the production of bags, sacks or the like, with two closely adjacent clamping jaws or heated welding jaws shiftable in the direction towards the foil to be welded and/or cut and between the clamping jaws a severing and welding bar shiftable in the same direction as and relatively to these jaws, whereby a clamping or stretching device capable of gripping the foil and being switched in and out is first arranged following the welding and cutting device in the direction in which the foil travels. According to another feature of the invention the clamping and welding jaws can also be shiftable in relation to each other.

Another important feature of the invention consists in that the foil web can be welded not only with a very narrow welding seam in the region of the outer edge of the foil or bag but at the same time a border weld of greater width than the edge seam and extending therefrom can also be carried out in addition to the above mentioned edge welding. For this purpose it is proposed according to the invention, that the clamping jaws or beams be also heatable and provided on the surfaces bearing against the foil with a heat-resisting plastic coating, particularly a coating composed of a fabric made from the synthetic substance known as "Teflon."

By this proposal, not only the advantage is derived that, beside the edge welding seam and extending therefrom a border weld of greater width is produced, but also that it is possible to weld foils of greater thickness and made from plastics which hitherto could not be welded at all or were very difficult to weld.

It is particularly advantageous to use as a coating for the welding jaws an adjustable foil or fabric which is unwound from a magazine roll and, after being guided upwards around the severing and welding bar over a shaft, is rewound on a roll on the opposite side thereof.

The invention also covers an arrangement wherein, instead of providing two adjacent clamping and welding jaws which are shiftable in relation to each other, the rear jaw in the direction in which the foil to be worked travels is dispensed with and the two clamping or welding jaws are made in one piece which can be turned through an angle of 180°, one end of this one-piece jaw having two pressing surfaces located in the same plane whereas the other end has two pressing surfaces located in different planes.

In order to produce a particularly effective welding of the foils, especially in the case of foils of thermoplastic synthetic materials which owing to their nature and thickness are very difficult to weld, it is proposed according to a further feature of the invention to duplicate the welding jaws even if they are in one piece and then to arrange one set above and the other directly opposite the first set below the foil to be welded, using only one severing and welding bar.

It is possible, for the production of bags with a bottom welded seam or a side welded seam, to insert severing and welding bars with different knife edges between the two clamping or welding jaws and to change these bars according to the work actually to be performed. However, it is advantageous, according to another feature of the invention to provide one severing and welding bar provided at its two opposite ends with differently constructed knife edges, one of which is suitable for the production of a bottom seam and the other for a side seam and to arrange this bar so that it can be turned through 180° about a horizontal axle extending transversely to the direction in which the foil web travels or to mount it so that rotation through 180° is possible.

According to another feature of the invention, it is proposed to provide the severing and welding bar with serrations or saw-teeth-like notches to enable perforations to be produced in the foils of thermoplastic substance.

The clamping or welding jaws are, according to another feature of the invention, resiliently supported on a crosshead which also carries the severing and welding bar. As a result, during the lowering of the welding or cutting device on to the foil, the desired relative displacement between the severing and welding bar and the clamping and welding jaws takes place automatically and it is also possible to block the clamping jaws as the crosshead descends so that only the severing and welding bar is moved in the direction towards the foil.

The invention is herinafter described in greater detail as applied to several embodiments of the invention illustrated by way of example in the accompanying drawing. However, many variations are possible without departing from the scope of the invention. In the drawing:

FIG. 1 shows in principle the production of bags with side welded seams;

FIG. 2 the production of bags with a bottom welded seam, and

FIG. 3 the arrangement for parting incisions or perforations in the foils or, in the example illustrated, in a tube, while FIG. 4 is a side elevation showing diagrammatically the production of bags with side welded seam according to FIG. 1;

FIG. 5 is a side elevation showing diagrammatically the production of bags with a bottom welded seam according to FIG. 2, and FIG. 6 is a side elevation showing diagrammatically the production of parting incisions or perforations according to FIG. 3;

FIG. 7 is a vertical section on a larger scale showing the arrangement of a welding device according to the invention, this being of double or twin construction with the exception of the severing and welding bar;

FIG. 8 is a vertical section of a one-piece arrangement of the two welding jaws, and FIG. 9 a vertical section of a further modification according to the invention, wherein the construction is duplicated with the exception of the severing and welding bar;

FIG. 10 is a side elevation viewed in the direction of travel of the foil to be welded or cut and shows diagrammatically the arrangement of the welding and cutting device;

FIG. 11 shows the welding of two foil webs at the edge solely with the severing and welding bar, while FIG. 12 shows the welding of two foil webs on the edge and in addition on a greater width;

FIG. 13 is a vertical section through a severing and welding bar provided with serrated knife edge, and FIG. 14 a side elevation of the severing and welding bar with serrated knife edge according to FIG. 13.

FIG. 1 shows the production of bags with a side weld, starting with a folded foil 15 or a tube cut open along one edge before a welded seam 10, a parting seam 11 or a second welded seam 12 is produced.

FIG. 2 is a diagrammatic view of a bag with bottom seam weld, whereby a plastic tube is utilized and only a welded seam 3 and a separating or parting seam 14 are produced, the parting seam 14 forming the opening or mouth of a previously produced bag and the welded seam 13 the bottom of the bag to be produced subsequently.

FIG. 3 shows the parting seam 16 of a tube of thermoplastic synthetic substance 15 dividing the tube into several sections. The parting seam can also be formed by a strip of thermoplastic synthetic material. 17 designates a perforated line formed by incisions 18.

FIG. 4 shows an arrangement for producing the bags according to FIG. 1 with a side seam welding. The tube 15, which can also consist of two layers of foil welded together, is fed and also held between intermittently rotating rollers 18 and 19, the tube travelling in the direction of the arrow 20. Clamping jaws 21 and 22 are located above and clamping jaws 21 and 22a below the foil web. Between the pairs of clamping jaws 21, 21a and 22, 22a a severing and welding bar 23 is arranged which, for producing a side seam weld is provided with a wedge-shaped knife edge and with two inclined faces or a double bevel 24 facing the foil 15. The severing and welding bar also has a second knife edge with only one inclined face or single bevel at its other end 25 which is inoperative when producing bags, sacks or the like with side seam weld according to FIG. 1. Above the foil 15 to be welded there is a stretching device 26 and below the foil a second stretching device 27. Each of the stretching devices is composed of rollers 28, 29 extending transversely across the web and provided with belts 30 circulating in the direction of the arrow 31. According to FIG. 4, the stretching devices 26, 27 are inoperative because they are moved away from the foil 15. When the foil 15 has been run forward by the rollers 18, 19 a distance corresponding to the width of a bag, that is the distance between the side seam weldings, the clamping jaws 21, 21a and 22, 22a are moved towards each other and firmly clamp the foil 15. The severing and welding bar 23 is then lowered and its two inclined surfaces 24 produce the welded seams 10 and 12 with the parting seam 11 between them. The clamping jaws 21 and 22 and also the severing and welding bar 23 are then raised and the foil 15 shifted in the direction of the arrow 20, whereupon the clamping jaws 21, 22 are again lowered, followed by the severing and welding bar 23, so that the next side seam welding takes place. The stretching devices 26, 27 remain inoperative. According to the arrangement shown in FIG. 4, the clamping jaws 21, 22 and 21a, 22a can also be heated but may may also remain cold. If they are cold the welding is effected on the outer side as indicated at 32 in FIG. 11. If the clamping jaws 21, 22 and possibly also 21a and 22a are heated, this will be explained later, not only the welded seam 32 but an additional weld of greater width is produced as indicated at 33 in FIG. 12.

FIG. 5 shows the production of a bottom seam weld according to FIG. 2. There is a parting seam 14 in addition to a welded seam 13. A second welded seam is lacking. The device corresponds exactly to that illustrated in FIG. 4 only for the production of the bottom seam weld other parts of the device are operative. For producing a bottom seam weld the foil 15 is tightly held between the clamping jaws 21 and 21a and the severing and welding bar 23 operates with the knife edge 25 which has only one inclined face which extends from the extremity of the band and faces towards the left in FIG. 5. The lamping jaws 22, 22a are moved apart and are consequently inoperative, whereas the belts 30, 31 of the stretching devices 26 and 27 bear against the foil 15 which is firmly held by the clamping jaws 21 and 21a, thus exerting a pull on the foil and stretching it. When the heated severing and welding bar 23 descends, the welded seam 13 and the parting seam 14 are produced. Then the clamping jaws 21 and 21a are moved apart and the severing and welding bar 23 is raised, whereupon the foil 15 is moved in the direction of the arrow 20 by the rollers 18, 19 until the portion cut off is again gripped by the stretching devices 26 and 27. The clamping jaws 21 and 21a are then again moved together, it being understood that clamping jaw 21a retains its position and only the clamping jaw 21 is raised and lowered, whereupon the heated severing and welding bar 23 is once more lowered in order to produce the next bottom seam weld according to FIG. 2.

According to FIG. 6, the rollers 18 and 19 feed the foil 15 in the direction of the arrow 20 and the stretching devices 26 and 27 are also operative. However, the clamping jaws 21, 21a as well as 22, 22a are both moved away from the foil 15. When the rollers 18, 19 are at a standstill, the stretching devices 26, 27 exert a pull on the foil and severing and welding bar 23, whose two wedge-shaped inclined faces are operative, severs the foil or foils 15. If the knife edge of the heated glow band is serrated as illustrated in FIGS. 13 and 14, the saw-like teeth 34 produce incisions 18 which constitute a row of perforations as shown in FIG. 3. After the parting cut has been effected the rollers 18 and 19 move the foil 15 the required distance in the direction of the arrow 20 and as soon as the foil has again been gripped by the stretching devices 26, 27 and thereby stretched, the heated glow band is lowered once more and cuts the foil.

The device illustrated in FIGS. 4, 5 and 6 is capable of carrying out different kinds of welding or to operate without welding, when it only produces a parting cut. It is not necessary to refit or make any changes in the device for the different kinds of work to be performed, especially if the severing and welding bar 23 can be turned through an angle of 180° about its axle 35. But even the exchanging of the severing and welding bar 23 does not require any appreciable refitting.

FIG. 7 shows on a larger scale clamping jaws 21 and 22 and 21a and 22a which are adjustable in relation to each other, whereby the relative displacement can be effected through the intermediary of screw belts 35 and counter nuts 36. It will be apparent that the clamping jaw 22a need not be shifted in relation to the clamping jaw 21a because the foil 15 is not clamped and no welding takes place as long as no pressure is exerted thereon. The clamping jaws 21, 21a and 22, 22a have apertures 37 for receiving a heating element 38 for heating the jaws when such heating is required. However, heating is not necessary if only a welded seam 32 is to be produced on the outer edges as shown in FIG. 11, but is employed when two foils 15 are to be welded on a greater width extending from the welded seam 32, as indicated by 33 in FIG. 12. For this purpose the clamping jaws 21, 21a and 22, 22a have an aperture 39 extending in longitudinal direction for receiving a shaft 40 which is preferably rotatable so that a web 45 of fabric, preferably of plastic material known as "Teflon" extending over the entire length of the welding device, can be unwound from the roll 42 in the direction of the arrow and, after passing around the bearing surface 43 of the clamping or welding jaw 21 which bears against the plastic foil 15, extends upwards to the shaft 40 clear of the severing and welding bar 23, runs over this shaft and descends in a similar manner on the other side thereof, rounding the lower end of the welding jaw 22 before being finally wound on the roll 44. The rolls 42 and 44 serve for moving the Teflon fabric web when it has become worn in the course of time. It is naturally within the scope of the invention to provide an arrangement in which the Teflon fabric only bears against the surfaces 43 facing the foil, is fixed in some other manner to that described and possibly not readjustable.

FIG. 8 shows as another embodiment that a relative displacement of the clamping or welding beams 21 and 22 is not necessary. These parts can be made in a one piece double ended structure providing they are arranged to turn through 180° about a central longitudinal axle. This pivot axle then forms the heating element 38 for heating the clamping or welding jaws. The Teflon web 45 is arranged in the same way as in FIG. 7 and here must also bear against the surfaces 43 directed towards the foil. FIG. 9 shows a particularly advantageous construction of the clamping or welding jaws 21, 21a and 22, 22a. It has been found that for the production of the different welds or parting cuts or perforations no relative displacement of the welding jaws 21, 21a and 22, 22a in relation to each other is necessary, that is that the surfaces 43 need not be at different distances from the foil 15. A condition is, however, that the severing and welding bar 23 is movable in relation to the welding jaws 21 and 22 even when these are made in one piece as shown in FIG. 9. For producing a side seam weld as shown in principle in FIGS. 1 and 4, all the surfaces 43 of the welding and clamping jaws 21, 21a and 22, 22a bear against the foil 15 to be welded. For producing parting cuts or perforations according to FIGS. 3 and 6, these surfaces are moved away from the foil 15. It has been found that they can also be located in the same plane for producing a bottom seam weld according to FIGS. 2 and 5 providing the severing and welding bar 23 moves ahead and projects beyond the plane of the surfaces 43 when the clamping jaws 21, 21a and 22, 22a are approached. The severing and welding bar then cuts through the foil 15 and the stretching devices 26 and 27, which are operative during the welding of a bottom seam, pull the severed part of the foil out of the range of operation of the pressing surfaces 43 of the clamping jaws 22, 22a so that no welding is possible because the foil would be pulled away on the right side of FIG. 9, but not, however, on the left side of the severing and welding bar so that the welding takes place there, the narrow weld 32 being effected by the severing and welding bar and the wide weld 33 by the clamping jaw. the width of the weld 33 being determined by the width of the surface 43. Also coming within the scope of the invention is to make the pressing surfaces 43 of different widths in the case of heated welding jaws, that is to fit strips of larger or smaller width on the existing bodies of the welding jaws so that these strips can be exchanged as required.

FIG. 10 shows the welding jaws mounted on the cross head 47 with the aid of springs, the arms 48 of the crosshead also carrying the severing and welding bar 23. The severing and welding bar 23 is mounted in the arms 48 so that it can easily be turned through 180°. FIG 10 shows only the arrangement above the foil 15 to be welded.

It has already been shown that the invention relates to the cutting of one foil but it is also applicable for cutting two superposed foils. It is likewise not restricted to the welding of only two superposed foils but the device is capable of welding more than two, for example three and four foils simultaneously, and also covers the folding over of the edge of a foil and welding the folded-over edge with the remainder of the web.

What we claim is:

1. An apparatus for severing and welding super-imposed thermoplastic sheets, said apparatus comprising opposed feed rolls for said sheets, sheet stretching means spaced from said feed rolls in the direction of travel of said sheets, said stretching means being removable from an inoperative position spaced from said sheets to an operative position engaging said sheets, opposed pairs of sheet clamping jaws disposed on opposite sides of said sheets between said feed rolls and stretching means, the jaws of each pair being spaced in the direction of travel of said sheets, said pairs of jaws being movable into and out of engagement with said sheets, and a heated severing and welding bar disposed between the jaws of one pair of jaws, one edge of said bar having a double bevel and the opposite edge having a single bevel, said bar being movable into and out of engagement with said sheets and selectively shiftable to position said double bevel or said single bevel opposite said sheets, said double bevel when in engagement with said sheets operating to sever said sheets and to weld said sheets together along opposite sides of the line of severance and said single bevel when in engagement with said sheets operating to sever said sheets and to weld said sheets together along only one side of the line of severance.

2. An apparatus as defined in claim 1, in which said severing and welding bar is mounted for rotation about its longitudinal axle to permit selective movement of the double bevel edge or the single bevel edge to operative position.

3. An apparatus as defined in claim 1, in which means is provided for heating at least one pair of said clamping jaws to provide an additional weld of greater width than the weld provided by said severing and welding bar.

4. An apparatus as defined in claim 3, in which a heat resistant plastic coating is provided on the sheet engaging surfaces of said heated jaws.

5. An apparatus as defined in claim 4, in which said coating is in the form of a web, said web being movable to provide a renewable sheet engaging surface.

6. An apparatus as defined in claim 5, in which a supply roll of said web is rotatably mounted on said apparatus, a web guide disposed between said heated jaws on the side of said severing and welding bar remote from said sheets, and a web take-up roll rotatably mounted on said apparatus, said web being trained from said supply roll around the sheet engaging surface of one heated jaw, around said guide, around the sheet engaging surface of the other heated jaw and onto said take-up roll.

7. An apparatus as defined in claim 1, in which said sheet stretching means comprises a pair of pulleys rotatably mounted on one side of said sheets, a belt trained over said pulleys, a second pair of pulleys rotatably mounted on the opposite side of said sheets, a second belt trained over said second pulleys, at least one pulley of each pair being driven, the runs of said belts adjacent said sheets being movable into engagement with said sheets to pull said sheets in the direction of travel thereof and being movable out of engagement with said sheets.

8. An apparatus as defined in claim 1, in which the jaws of each pair are in two parts, each part having a sheet engaging surface, and means for adjusting said parts with respect to each other toward or away from said sheets to dispose the sheet engaging surfaces in different planes.

9. An apparatus as defined in claim 1, in which each pair of jaws is a unitary one-piece double ended structure, one end of said structure having a pair of spaced jaws with sheet engaging surfaces disposed in the same plane, the other end of said structure having a pair of spaced jaws offset to dispose the sheet engaging surfaces in different planes, and means rotatably mounting each structure on said apparatus to permit selective use of either end of said structure.

10. An apparatus as defined in claim 1, in which each pair of jaws is a unitary one-piece structure with the sheet engaging surfaces of each pair disposed in the same plane, said severing and welding bar being movable toward and away from said sheets independently of the movement of said jaws toward and away from said sheets.

11. An apparatus as defined in claim 1 and including a cross head, at least certain of said clamping jaws being resiliently mounted on said cross head, and said severing and welding bar being mounted on said cross head.

12. An apparatus as defined in claim 1, in which at least one edge of said severing and welding bar is serrated.

References Cited by the Examiner
UNITED STATES PATENTS

| | | | |
|---|---|---|---|
| 2,652,879 | 10/1953 | Keller et al. | 156—495 |
| 2,726,706 | 12/1955 | Hakomaki | 156—515 |
| 3,015,600 | 1/1962 | Cook | 156—515 |
| 3,033,257 | 5/1962 | Weber | 156—515 |
| 3,060,075 | 10/1962 | Kincaid | 156—251 |

EARL M. BERGERT, *Primary Examiner.*

DOUGLAS DRUMMOND, *Assistant Examiner.*